US011199986B2

(12) United States Patent
Venkatanarayanan et al.

(10) Patent No.: US 11,199,986 B2
(45) Date of Patent: Dec. 14, 2021

(54) SYSTEM AND METHOD FOR DATA MIGRATION ACROSS STORAGE SYSTEMS

(71) Applicant: EMC IP Holding Company, LLC, Hopkinton, MA (US)

(72) Inventors: Prakash Venkatanarayanan, Bangalore (IN); Gaurav Mukul Bhatnagar, Bangalore (IN); Sreenivasa Honnur Sathyanarayana, Bangalore (IN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/530,817

(22) Filed: Aug. 2, 2019

(65) Prior Publication Data

US 2021/0034275 A1 Feb. 4, 2021

(51) Int. Cl.
*G06F 3/06* (2006.01)
(52) U.S. Cl.
CPC ............ *G06F 3/0647* (2013.01); *G06F 3/065* (2013.01); *G06F 3/0617* (2013.01); *G06F 3/0644* (2013.01); *G06F 3/0683* (2013.01)
(58) Field of Classification Search
CPC .... G06F 12/00; G06F 3/06477; G06F 3/0647; G06F 3/0617; G06F 3/0644; G06F 3/065; G06F 3/0683
USPC ........................................................ 711/100
See application file for complete search history.

(56) References Cited

U.S. PATENT DOCUMENTS

| 6,141,705 | A | * | 10/2000 | Anand | ................. | G06F 9/5044 709/203 |
| 2013/0326546 | A1 | * | 12/2013 | Bavishi | ................. | G06F 16/119 719/328 |
| 2014/0068233 | A1 | * | 3/2014 | Ueda | ................. | G06F 9/30007 712/225 |
| 2015/0378847 | A1 | * | 12/2015 | Tarasuk-Levin | .... | G06F 11/2097 714/19 |

* cited by examiner

*Primary Examiner* — Gautam Sain
(74) *Attorney, Agent, or Firm* — Brian J. Colandreo; Mark H. Whittenberger; Holland & Knight LLP (57) ABSTRACT

A method, computer program product, and computer system for requesting, by a computing device, information about whether a source and a destination belong to one of a same storage array and storage cluster. Information may be requested about whether the source and the destination support direct data transfer mechanisms between the source and the destination. A copy process may be offloaded from a host computing device to the source and the destination to copy data from the source to the destination when the source and the destination belong to one of a different storage array and storage cluster and when the source and the destination support the direct data transfer mechanisms, and the copy process may be executed on the host device to copy data from the source to the destination when one of the source and the destination does not support the direct data transfer mechanisms.

17 Claims, 5 Drawing Sheets

SYSTEM AND METHOD FOR DATA MIGRATION ACROSS STORAGE SYSTEMS

BACKGROUND

In today's constant change and technological advances, migration of customer data from one storage system to another remains a constant challenge. Migration is often required across a family of products within the same company, and sometimes, this is required when the entire array is ready for a tech refresh. Either way, the need to migrate data always exist.

BRIEF SUMMARY OF DISCLOSURE

In one example implementation, a method, performed by one or more computing devices, may include but is not limited to requesting, by a computing device, information about whether a source and a destination belong to one of a same storage array and storage cluster. Information may be requested about whether the source and the destination support direct data transfer mechanisms between the source and the destination. A copy process may be offloaded from a host computing device to the source and the destination to copy data from the source to the destination when the source and the destination belong to one of a different storage array and storage cluster and when the source and the destination support the direct data transfer mechanisms, and the copy process may be executed on the host device to copy data from the source to the destination when one of the source and the destination does not support the direct data transfer mechanism.

One or more of the following example features may be included. Requesting the information may include transmitting a SCSI command to the source and the destination. A volume of the destination is not in a remote replication relationship. One or more validation operations may be performed by the host device when the source and the destination belong to one of the different storage array and storage cluster and when the source and the destination support the direct data transfer mechanisms_. At least one of the one or more validation operations may include querying identifiers of remote storage arrays that have an existing remote replication partnership. One or more validation operations may be offloaded from the host device to one of the source and the destination when the source and the destination belong to one of the different storage array and storage cluster and when the source and the destination support the direct data transfer mechanisms. The copy process may be executed on the host device to copy data from the source to the destination if offloading the copy process from the host computing device to the source and the destination to copy the data from the source to the destination fails.

In another example implementation, a computing system may include one or more processors and one or more memories configured to perform operations that may include but are not limited to requesting information about whether a source and a destination belong to one of a same storage array and storage cluster. Information may be requested about whether the source and the destination support direct data transfer mechanisms between the source and the destination. A copy process may be offloaded from a host computing device to the source and the destination to copy data from the source to the destination when the source and the destination belong to one of a different storage array and storage cluster and when the source and the destination support the direct data transfer mechanisms, and the copy process may be executed on the host device to copy data from the source to the destination when one of the source and the destination does not support the direct data transfer mechanisms.

One or more of the following example features may be included. Requesting the information may include transmitting a SCSI command to the source and the destination. A volume of the destination is not in a remote replication relationship. One or more validation operations may be performed by the host device when the source and the destination belong to one of the different storage array and storage cluster and when the source and the destination support the direct data transfer mechanisms_. At least one of the one or more validation operations may include querying identifiers of remote storage arrays that have an existing remote replication partnership. One or more validation operations may be offloaded from the host device to one of the source and the destination when the source and the destination belong to one of the different storage array and storage cluster and when the source and the destination support the direct data transfer mechanisms. The copy process may be executed on the host device to copy data from the source to the destination if offloading the copy process from the host computing device to the source and the destination to copy the data from the source to the destination fails.

In another example implementation, a computer program product may reside on a computer readable storage medium having a plurality of instructions stored thereon which, when executed across one or more processors, may cause at least a portion of the one or more processors to perform operations that may include but are not limited to requesting information about whether a source and a destination belong to one of a same storage array and storage cluster. Information may be requested about whether the source and the destination support direct data transfer mechanisms between the source and the destination. A copy process may be offloaded from a host computing device to the source and the destination to copy data from the source to the destination when the source and the destination belong to one of a different storage array and storage cluster and when the source and the destination support the direct data transfer mechanisms, and the copy process may be executed on the host device to copy data from the source to the destination when the source and the destination belong to one of the same storage array and storage cluster and when one of the source and the destination does not support the direct data transfer mechanisms.

One or more of the following example features may be included. Requesting the information may include transmitting a SCSI command to the source and the destination. A volume of the destination is not in a remote replication relationship. One or more validation operations may be performed by the host device when the source and the destination belong to one of the different storage array and storage cluster and when the source and the destination support the direct data transfer mechanisms_. At least one of the one or more validation operations may include querying identifiers of remote storage arrays that have an existing remote replication partnership. One or more validation operations may be offloaded from the host device to one of the source and the destination when the source and the destination belong to one of the different storage array and storage cluster and when the source and the destination support the direct data transfer mechanisms. The copy process may be executed on the host device to copy data from the source to the destination if offloading the copy process from the host computing device to the source and the destination to copy the data from the source to the destination fails.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
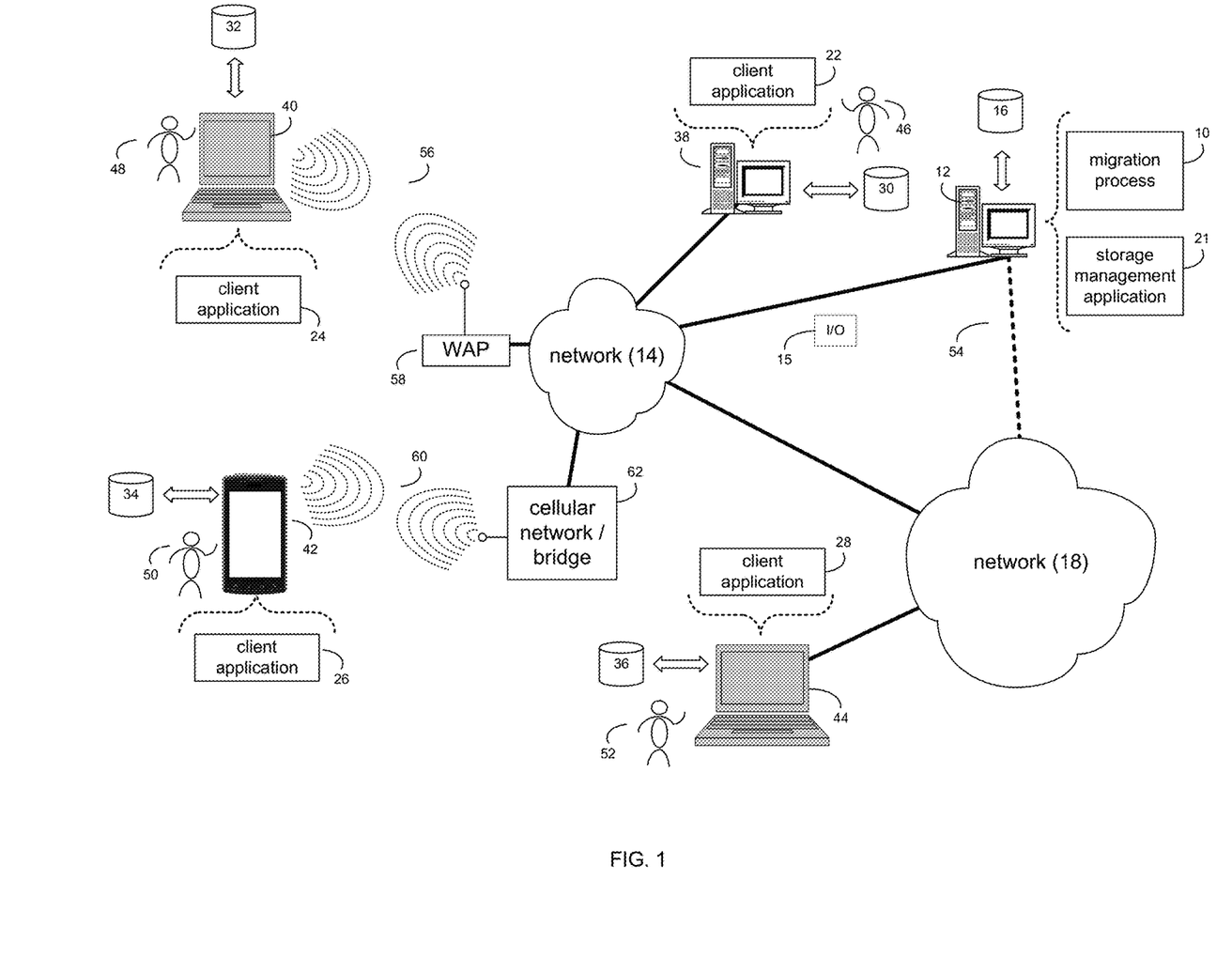
FIG. 1 is an example diagrammatic view of a migration process coupled to an example distributed computing network according to one or more example implementations of the disclosure.

Referring now to the example implementation of FIG. 1, there is shown migration process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a migration process, such as migration process 10 of FIG. 1, may request, by a computing device, information about whether a source and a destination belong to one of a same storage array and storage cluster. Information may be requested about whether the source and the destination support direct data transfer mechanisms between the source and the destination. A copy process may be offloaded from a host computing device to the source and the destination to copy data from the source to the destination when the source and the destination belong to one of a different storage array and storage cluster and when the source and the destination support the direct data transfer mechanisms, and the copy process may be executed on the host device to copy data from the source to the destination when one of the source and the destination does not support the direct data transfer mechanisms.

In some implementations, the instruction sets and subroutines of migration process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, migration process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, migration process 10 and/or storage management application 21 may be accessed via one or more of client applications 22, 24, 26, 28. In some implementations, migration process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within migration process 10, a component of migration process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of migration process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of migration process 10 (and vice versa). Accordingly, in some implementations, migration process 10 may be a purely server-side application, a purely client-side application, or a hybrid server-side/client-side application that is cooperatively executed by one or more of client applications 22, 24, 26, 28 and/or migration process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, migration process 10, and storage management application 21, taken singly or in any combination, may effectuate some or all of the same functionality, any description of effectuating such functionality via one or more of client applications 22, 24, 26, 28, migration process 10, storage management application 21, or combination thereof, and any described interaction(s) between one or more of client applications 22, 24, 26, 28, migration process 10, storage management application 21, or combination thereof to effectuate such functionality, should be taken as an example only and not to limit the scope of the disclosure.

In some implementations, one or more of users 46, 48, 50, 52 may access computer 12 and migration process 10 (e.g., using one or more of client electronic devices 38, 40, 42, 44) directly through network 14 or through secondary network 18. Further, computer 12 may be connected to network 14 through secondary network 18, as illustrated with phantom link line 54. Migration process 10 may include one or more user interfaces, such as browsers and textual or graphical user interfaces, through which users 46, 48, 50, 52 may access migration process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
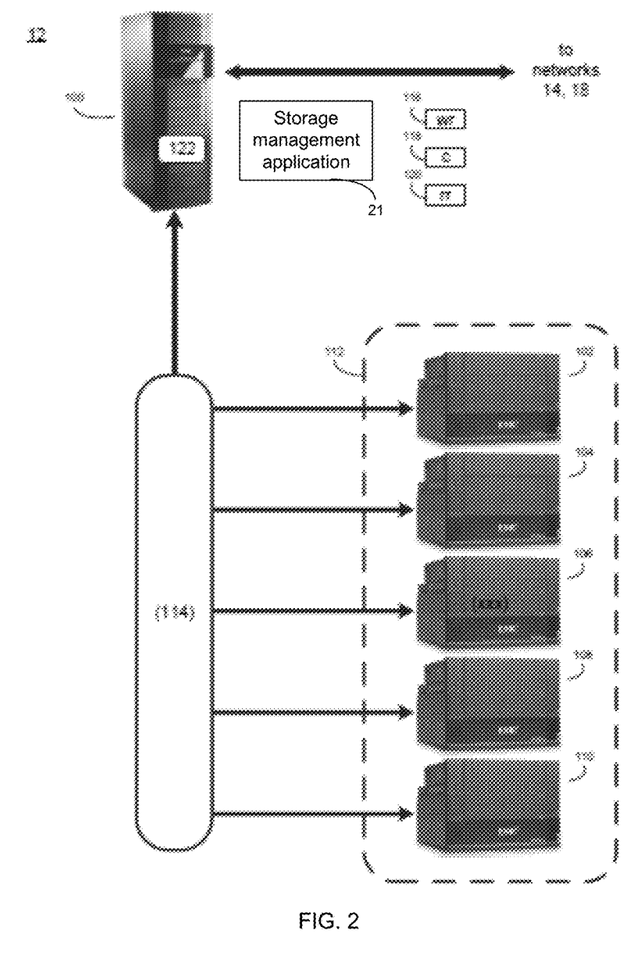
FIG. 2 is an example diagrammatic view of a storage system of FIG. 1 according to one or more example implementations of the disclosure.
Figure 3:
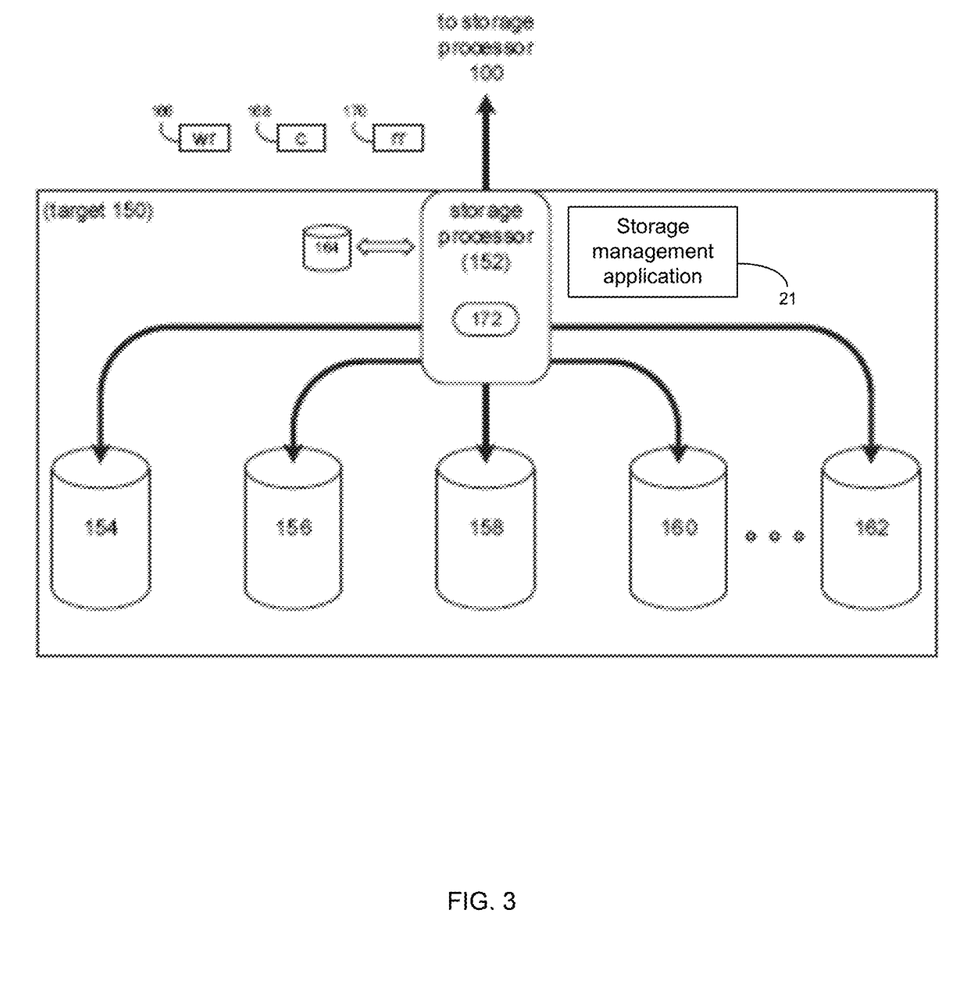
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or migration process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, migration of customer data from one storage system to another remains a constant challenge. Migration is often required across a family of products within the same company, and sometimes, this is required when the entire array is ready for a tech refresh. Either way, the need to migrate data always exist. There are a number of tools available in the market and they vary in ease of use to complexity to performance challenges. They also generally limit themselves to what arrays or host platforms they support. The application reconfiguration and down-time associated with migration is also a non-trivial challenge. Some migration solutions may work without needing any application down-time and may not need any application reconfiguration. However, if the source and destination datastores reside within the same storage array (or say, within the same Equallogic group), such migration solutions may offload the storage copy to the array. This may make the copy process faster. If the source and destination datastores reside across two different storage systems (or two different company platforms), then the migration solutions may perform the host-based reads and writes. This may not scale well, since this approach significantly reduces the performance of the copy operation for large sized datastores. Another disadvantage is that this operation may overload the host CPU, which could affect other applications on the host system.

Therefore, as will be discussed below, the present disclosure may introduce a new variant of an extended copy process that may work across arrays, clusters, and different company platforms (i.e., vender neutral). This may be supported by the arrays that want to speed up the migration process, and if this is not supported, the existing method will continue to work.

Figure 4:
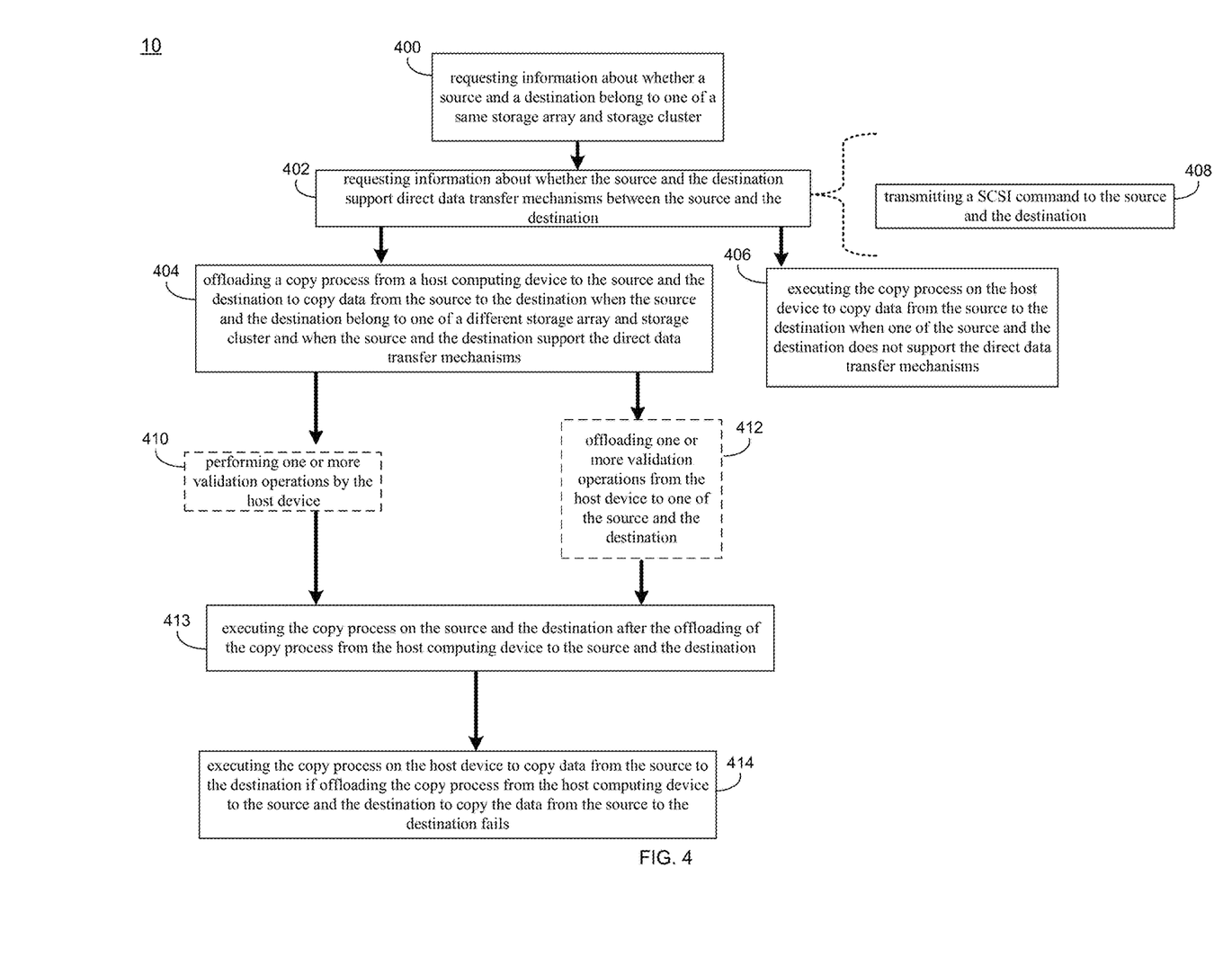
FIG. 4 is an example flowchart of a migration process according to one or more example implementations of the disclosure.
Figure 5:
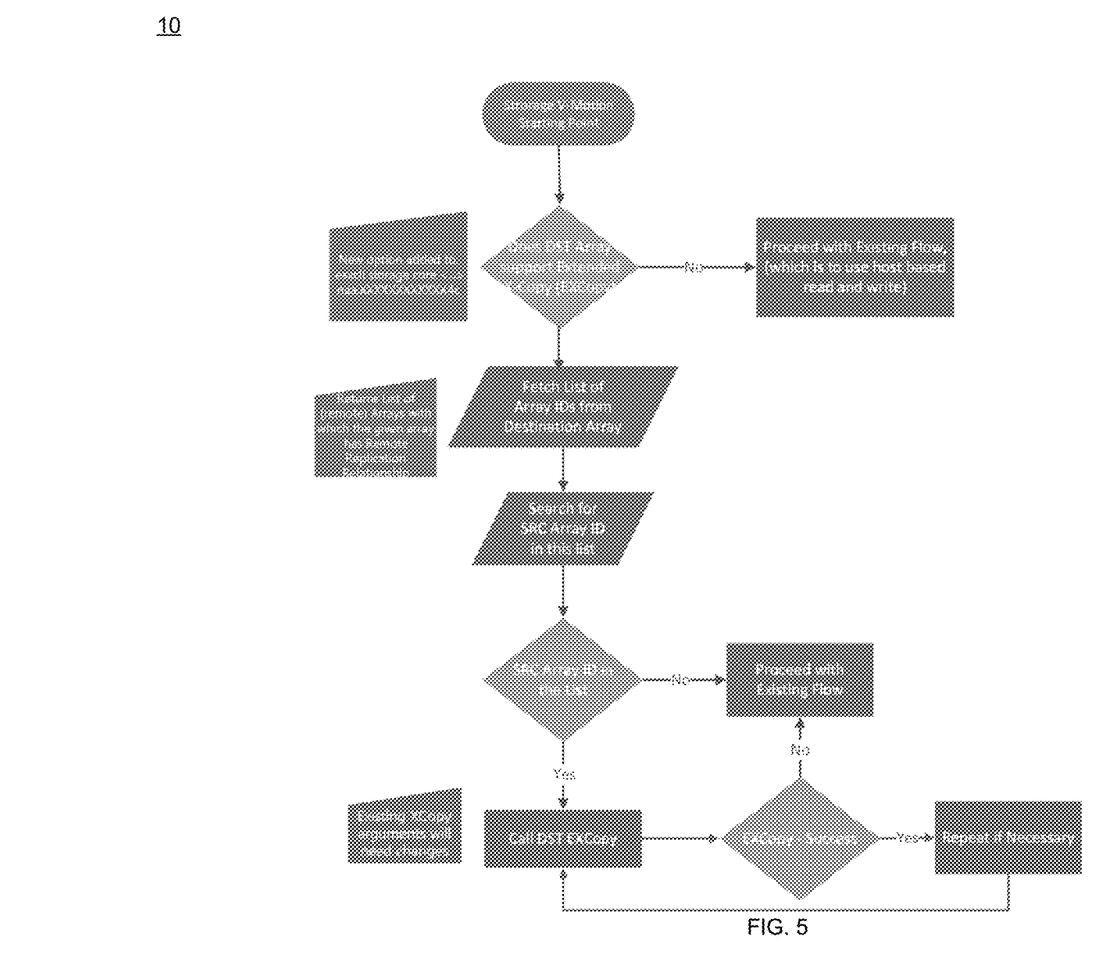
FIG. 5 is an example flowchart of a migration process according to one or more example implementations of the disclosure.

The Migration Process:

As discussed above and referring also at least to the example implementations of FIGS. 4-5, migration process 10 may request 400, by a computing device, information about whether a source and a destination belong to one of a same storage array and storage cluster. Migration process 10 may request 402 information about whether the source and the destination support direct data transfer mechanisms between the source and the destination. Migration process 10 may offload 404 a copy process from a host computing device to the source and the destination to copy data from the source to the destination when the source and the destination belong to one of a different storage array and storage cluster and when the source and the destination support the direct data transfer mechanisms, and migration process 10 may execute 406 the copy process on the host device to copy data from the source to the destination when one of the source and the destination does not support the direct data transfer mechanisms.

While the present disclosure is described using existing technology/tools, such as X-Copy (a SCSI command where a copy operation is offloaded to the array software), it will be appreciated that the present disclosure may be applied similarly to other migration technologies/tools without departing from the scope of the present disclosure. As such, the use of terminology specific to any one existing technology/tool should be taken as example only and not to otherwise limit the scope of the present disclosure.

As noted above, "X-Copy" or extended copy may be a standard SCSI command, where a copy operation is offloaded to the array software. Today, this is supported when both source and destination volume is within the same array (or say, same storage system/cluster). However, as will be discussed below, migration process 10 may provide enhanced capabilities (e.g., enhanced X-Copy) that may be used by the host software to offload a copy operation, wherein the source and destination volumes can be in separate storage systems, separate clusters, and provided by different venders. In some implementations, the arrays may make use of some existing replication technology to achieve this copy operation, since making use of array's existing replication relationship may alleviate the security related aspects of this copy operation.

For example, replication may exist not just between arrays of same example product family (e.g., Unity to Unity) but also across example product families (Equallogic to SC Compellent). Thus, leveraging the existing replication may make the solution broad based without having to worry about the security of data channel between the source and destination. For example, in an example and non-limiting ESX platform, the 'esxcli storage core' may be extended to add this Enhanced X-Copy. In some implementations, arrays which support this feature may advertise this fact to hosts. An non-limiting example is shown below:

[root@localhost:~] esxcli storage core device vaai status get
   naa.64ed2af567ebe20c48c985609ae709c7
   VAAI Plugin Name:
   ATS Status: supported
   Clone Status: supported
   Zero Status: supported
   Delete Status: supported
   EXCopy: supported In some implementations, migration process 10 may request 400, by a computing device, information about whether a source and a destination belong to one of a same storage array and storage cluster, and in some implementations, migration process 10 may request 402 information about whether the source and the destination support direct data transfer mechanisms between the source and the destination, and requesting 400/402 the information may include transmitting 408 a SCSI command to the source and the destination. For example, migration process 10 may request one or more INQUIRY (INQ) pages from the source and destination to determine if they belong to the same storage array (or storage array cluster). When they are different, migration process 10 may will issue the example existing command (esxcli core storage <dev>) on the destination device to see if the array supports this new Enhanced X-Copy command (as noted above). In some implementations, this command may also be sent to source device and the same results may be expected if the array supports the same.

In some implementations, migration process 10 may offload 404 a copy process from a host computing device to the source and the destination to copy data from the source to the destination when the source and the destination belong to one of a different storage array and storage cluster and when the source and the destination support the direct data transfer mechanisms (which may then be executed 413 on the source and the destination after the offloading of the copy process from the host computing device), and migration process 10 may execute 406 the copy process on the host device to copy data from the source to the destination when one of the source and the destination does not support the direct data transfer mechanisms. For example, migration process 10 may offload 404 a copy process from a host computing device to the source and the destination storage array/cluster to copy data from the source to the destination if the source and the destination belong either a different storage array or storage cluster, and if the source and the destination support the direct data transfer mechanisms (e.g., non-host based reads and writes).

In some implementations, a volume of the destination is not in a remote replication relationship. For example, the destination volume, which is receiving the command should not already be in remote replication relationship. This is because, typically, such volumes are not exposed to the host and even if they were exposed, they are in read-only mode (and therefore do not support both non-host based reads and writes). As such, the volume should not be in a prior remote replication relationship while the arrays themselves could be in this remote partnership already.

In some implementations, migration process 10 may perform 410 one or more validation operations by the host device when the source and the destination belong to one of the different storage array and storage cluster and when the source and the destination support the direct data transfer mechanisms, and in some implementations, Migration process 10 may offload 412 one or more validation operations from the host device to one of the source and the destination when the source and the destination belong to one of the different storage array and storage cluster and when the source and the destination support the direct data transfer mechanisms. For example, if the array supports the extended copy feature, the host may perform some additional validation. This validation step may be optional and not mandatory, since the array may also perform the validation and so host may avoid additional changes by offloading such checks.

In some implementations, at least one of the one or more validation operations may include querying identifiers of remote storage arrays that have an existing remote replication partnership. For instance, should the host decide to do some validation, the host may query the array to return the array identifiers of all remote arrays, to which there exists a remote replication partnership. This may then be checked with both source and destination volume's array identifiers. Only if there is a match, migration process 10 may proceed to make use of this new feature. If not, migration process 10 may directly proceed with "normal" host-based reads and writes. Should the returned array identifiers match with what the host is getting from the source and destination volumes, the host may issue the Enhanced X-Copy command (e.g., via a T10 plug-in) to the destination.

If the host decides to skip the validation and offload 412 it, the host may directly send the X-copy command to the destination. The destination array, on receiving this, may perform the above-noted validation, among others. This may include checking if the given source identifier (e.g., WWN format) is already in a remote replication relationship. The array may fail this command for several other reasons also, which may include the current network connectivity status, and should this command fail, the host may fall back to the "normal" host-based reads and writes.

In some implementations, migration process 10 may execute 414 the copy process on the host device to copy data from the source to the destination if offloading the copy process from the host computing device to the source and the destination to copy the data from the source to the destination fails. For instance, the host software may issue the example copy results (e.g., SCSI RECEIVE COPY RESULTS) to get the command completion. If there is a failure, the host software may fall back to the "normal" host-based reads and writes to complete the migration. Thus, the end user may not be affected even if the array does not support or is not able to complete the copy offload request. An alternative flowchart of migration process 10 describing the above is shown in FIG. 5. Therefore, if it is possible to offload the migration of data from the host to the source/destination on different storage arrays/clusters/platforms, migration process 10 may do so, and if it is not possible or fails, "normal" host-based reads and writes will execute the copy process.

As a result of the present disclosure, the scale/performance of example systems, like Storage V-Motion, may be significantly increased, since the copy process may be performed by the arrays, rather than the host. This may be a direct copy and so performance will be much better, and the host copy is not affected by this operation. Moreover, the present disclosure is vendor neutral and may be extended to other host platforms, and moreover, this offering may be exposed to other storage arrays.

Additionally, some array based seamless solutions work on a concept called spoofing, which works when we migrate within the same family of arrays and within SCSI. This does not work when we migrate across product families. Plus, even within the same product family, such a solution will not work, when we want to migrate from SCSI to NVMe, since the host storage stack is split/separate for NVMe and SCSI. However, by implementing the present disclosure, since the copy operation may be offloaded to the source and destination, the present disclosure may solve some challenges in the current host spoofing-based migration solutions, when the system goes across, e.g., SCSI to NVMe.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
 requesting, by a computing device, information about whether a source storage system and a destination storage system belong to one of a same storage array and storage cluster, wherein requesting the information includes transmitting a small computer system interface (SCSI) command to the source storage system and the destination storage system, wherein transmitting the SCSI command includes requesting one or more pages from the source storage system and the destination storage system to effectuate determining whether the source storage system and the destination storage system belong to one of the same storage array and storage cluster;

requesting, by the computing device, information about whether the source storage system and the destination storage system support direct data transfer mechanisms between the source storage system and the destination storage system;

offloading a copy process from a host computing device to the source storage system and the destination storage system to copy data from the source storage system to the destination storage system when the source storage system and the destination storage system belong to one of a different storage array and storage cluster and when the source storage system and the destination storage system support the direct data transfer mechanisms, and executing the copy process on the host computing device to copy data from the source storage system to the destination storage system when one of the source storage system and the destination storage system does not support the direct data transfer mechanisms; and performing one or more validation operations by the host computing device when the source storage system and the destination storage system belong to one of the different storage array and storage cluster and when the source storage system and the destination storage system support the direct data transfer mechanisms.

2. The computer-implemented method of claim 1 wherein a volume of the destination storage system is not in a remote replication relationship.

3. The computer-implemented method of claim 1 wherein at least one of the one or more validation operations includes querying identifiers of remote storage arrays that have an existing remote replication partnership.

4. The computer-implemented method of claim 3 wherein querying the identifiers of the remote storage arrays having the existing remote replication partnership effectuates a return of the identifiers of the remote storage arrays, such that when the returned identifiers of the remote storage arrays from the source storage system and destination storage system volume matches, the host will issue an Enhanced X-Copy command to the destination storage system.

5. The computer-implemented method of claim 1 further comprising offloading one or more validation operations from the host computing device to one of the source storage system and the destination storage system when the source storage system and the destination storage system belong to one of the different storage array and storage cluster and when the source storage system and the destination storage system support the direct data transfer mechanisms.

6. The computer-implemented method of claim 1 further comprising executing the copy process on the host computing device to copy data from the source storage system to the destination storage system if offloading the copy process from the host computing device to the source storage system and the destination storage system to copy the data from the source storage system to the destination storage system fails.

7. The computer-implemented method of claim 1 wherein determining that the source storage system and the destination storage system do not belong to one of the same storage array and storage cluster includes issuing the SCSI command to at least one of the source storage system and the destination storage system to effectuate determining if the storage array supports an Enhanced X-copy command.

8. A computer program product residing on a non-transitory computer readable storage medium having a plurality of instructions stored thereon which, when executed across one or more processors, causes at least a portion of the one or more processors to perform operations comprising:

requesting information about whether a source storage system and a destination storage system belong to one of a same storage array and storage cluster, wherein requesting the information includes transmitting a small computer system interface (SCSI) command to the source storage system and the destination storage system, wherein transmitting the SCSI command includes requesting one or more pages from the source storage system and the destination storage system to effectuate determining whether the source storage system and the destination storage system belong to one of the same storage array and storage cluster;

requesting information about whether the source storage system and the destination storage system support direct data transfer mechanisms between the source storage system and the destination storage system;

offloading a copy process from a host computing device to the source storage system and the destination storage system to copy data from the source storage system to the destination storage system when the source storage system and the destination storage system belong to one of a different storage array and storage cluster and when the source storage system and the destination storage system support the direct data transfer mechanisms, and executing the copy process on the host computing device to copy data from the source storage system to the destination storage system when one of the source storage system and the destination storage system does not support the direct data transfer mechanisms; and performing one or more validation operations by the host computing device when the source storage system and the destination storage system belong to one of the different storage array and storage cluster and when the source storage system and the destination storage system support the direct data transfer mechanisms.

9. The computer program product of claim 8 wherein a volume of the destination storage system is not in a remote replication relationship.

10. The computer program product of claim 8 wherein at least one of the one or more validation operations includes querying identifiers of remote storage arrays that have an existing remote replication partnership.

11. The computer program product of claim 8 wherein the operations further comprise offloading one or more validation operations from the host computing device to one of the source storage system and the destination storage system when the source storage system and the destination storage system belong to one of the different storage array and storage cluster and when the source storage system and the destination storage system support the direct data transfer mechanisms.

12. The computer program product of claim 8 wherein the operations further comprise executing the copy process on the host computing device to copy data from the source storage system to the destination storage system if offloading the copy process from the host computing device to the source storage system and the destination storage system to copy the data from the source storage system to the destination storage system fails.

13. A computing system comprising:
one or more memories; and
one or more processors configured to:

request information about whether a source storage system and a destination storage system belong to one of a same storage array and storage cluster, wherein requesting the information includes transmitting a small computer system interface (SCSI) command to the source storage system and the destination storage system, wherein transmitting the SCSI command includes requesting one or more pages from the source storage system and the destination storage system to effectuate determining whether the source storage system and the destination storage system belong to one of the same storage array and storage cluster;

request information about whether the source storage system and the destination storage system support direct data transfer mechanisms between the source storage system and the destination storage system;

offload a copy process from a host computing device to the source storage system and the destination storage system to copy data from the source storage system to the destination storage system when the source storage system and the destination storage system belong to one of a different storage array and storage cluster and when the source storage system and the destination storage system support the direct data transfer mechanisms, and execute the copy process on the host computing device to copy data from the source storage system to the destination storage system when one of the source storage system and the destination storage system does not support the direct data transfer mechanisms; and perform one or more validation operations by the host computing device when the source storage system and the destination storage system belong to one of the different storage array and storage cluster and when the source storage system and the destination storage system support the direct data transfer mechanisms.

14. The computing system of claim 13 wherein a volume of the destination storage system is not in a remote replication relationship.

15. The computing system of claim 13 wherein at least one of the one or more validation operations includes querying identifiers of remote storage arrays that have an existing remote replication partnership.

16. The computing system of claim 13 wherein the one or more processors is further configured to offload one or more validation operations from the host computing device to one of the source storage system and the destination storage system when the source storage system and the destination storage system belong to one of the different storage array and storage cluster and when the source storage system and the destination storage system support the direct data transfer mechanisms.

17. The computing system of claim 13 wherein the one or more processors is further configured to execute the copy process on the host computing device to copy data from the source storage system to the destination storage system if offloading the copy process from the host computing device to the source storage system and the destination storage system to copy the data from the source storage system to the destination storage system fails.

* * * * *